(12) United States Patent
Hafen et al.

(10) Patent No.: US 9,725,654 B2
(45) Date of Patent: Aug. 8, 2017

(54) OIL PRODUCTION SYSTEM AND METHODS

(76) Inventors: Brian Hafen, Draper, UT (US); Lynn Clingo, Pleasant Grove, UT (US); Michael Ostler, West Jordan, UT (US)

( * ) Notice: Subject to any disclaimer, the term of this patent is extended or adjusted under 35 U.S.C. 154(b) by 704 days.

(21) Appl. No.: 13/880,954

(22) PCT Filed: Oct. 21, 2011

(86) PCT No.: PCT/US2011/057289
§ 371 (c)(1),
(2), (4) Date: Aug. 8, 2013

(87) PCT Pub. No.: WO2012/054834
PCT Pub. Date: Apr. 26, 2012

(65) Prior Publication Data
US 2013/0317266 A1 Nov. 28, 2013

(51) Int. Cl.
| | |
|---|---|
| *C10B 1/10* | (2006.01) |
| *C10G 1/02* | (2006.01) |
| *C10B 47/46* | (2006.01) |
| *C10B 53/00* | (2006.01) |
| *C10B 53/06* | (2006.01) |
| *C10B 53/07* | (2006.01) |
| *C10G 1/00* | (2006.01) |
| *C10G 1/10* | (2006.01) |

(52) U.S. Cl.
CPC ............... *C10G 1/02* (2013.01); *C10B 47/46* (2013.01); *C10B 53/00* (2013.01); *C10B 53/06* (2013.01); *C10B 53/07* (2013.01); *C10G 1/002* (2013.01); *C10G 1/10* (2013.01); *C10G 2300/1003* (2013.01); *Y02P 20/143* (2015.11)

(58) Field of Classification Search
CPC .................................. C10B 1/10; C10B 47/30
USPC ............ 201/16, 30; 202/105, 136, 218, 249; 422/608, 610
See application file for complete search history.

(56) References Cited

U.S. PATENT DOCUMENTS 1,547,331 A * 7/1925 Kacser ...................... C10B 1/10
202/136
3,844,930 A * 10/1974 Wunderlich ............ C10B 53/06
208/411

(Continued)

FOREIGN PATENT DOCUMENTS

WO WO 2010-028506 3/2010

*Primary Examiner* — Jill Warden
*Assistant Examiner* — Dwayne K Handy
(74) *Attorney, Agent, or Firm* — Thorpe North and Western, LLP; David W. Osborne

(57) ABSTRACT

A system for producing oil is disclosed. The system may comprise a container for a naturally occurring or synthetically produced hydrocarbon source material. The system may also comprise a material preparation device to physically degrade the hydrocarbon source material into small pieces. The system may further comprise a heat source to heat the hydrocarbon source material indirectly by heating the container, the hydrocarbon source material being heated to a temperature sufficient to gasify hydrocarbons in the hydrocarbon source material and release the hydrocarbons therefrom. The system may still further comprise a fractionation device fluidly coupled to the container to receive the hydrocarbons and separate the hydrocarbons into like components. Additionally, the system may comprise a collection container to receive the like components.

8 Claims, 6 Drawing Sheets

(56) References Cited

U.S. PATENT DOCUMENTS

| | | | |
|---|---|---|---|
| 4,022,511 | A | 5/1977 | French |
| 4,266,609 | A | 5/1981 | Rom et al. |
| 4,332,675 | A | 6/1982 | Baset |
| 4,376,034 | A | 3/1983 | Wall |
| 4,431,511 | A | 2/1984 | Olmstead |
| 4,440,445 | A | 4/1984 | Hutchins |
| 4,458,757 | A | 7/1984 | Bock et al. |
| 4,461,696 | A | 7/1984 | Bock et al. |
| 4,501,644 | A | 2/1985 | Thomas |
| 4,566,965 | A | 1/1986 | Olmstead |
| 4,587,004 | A | 5/1986 | Siskin et al. |
| 4,610,303 | A | 9/1986 | Kazak et al. |
| 4,705,622 | A | 11/1987 | Siskin et al. |
| 4,817,711 | A | 4/1989 | Jeambey |
| 4,912,971 | A | 4/1990 | Jeambey |
| 5,194,069 | A | 3/1993 | Someus |
| 5,261,936 | A | 11/1993 | Someus |
| 5,499,586 | A | 3/1996 | Davis |
| 5,662,052 | A * | 9/1997 | McIntosh ................ C10B 47/30 110/229 |
| 5,904,904 | A | 5/1999 | Swanson |
| 6,835,244 | B2 | 12/2004 | Oates et al. |
| 7,484,561 | B2 | 2/2009 | Bridges |
| 2004/0007507 | A1* | 1/2004 | Smith .......................... 208/400 |
| 2005/0113224 | A1 | 5/2005 | Dovner et al. |
| 2006/0076275 | A1 | 4/2006 | Smith |
| 2007/0294937 | A1 | 12/2007 | Stein |
| 2008/0083864 | A1 | 4/2008 | Davis |
| 2009/0095659 | A1 | 4/2009 | Morris, Jr. et al. |

\* cited by examiner

OIL PRODUCTION SYSTEM AND METHODS

PRIORITY DATA

This application claims the benefit of U.S. Provisional Patent Application Ser. No. 61/405,360, filed on Oct. 21, 2010, which is incorporated herein by reference.

FIELD OF THE INVENTION

The present invention relates generally to oil production systems and associated methods. Accordingly, the present invention involves the mechanical arts and chemical arts.

BACKGROUND OF THE INVENTION

Many of earth's known oil reserves are contained in material that does not readily yield oil by traditional methods, such as drilling. Such reserves are contained in oil shale, tar sand, coal, slurp-sludge, etc. Moreover, some of the oil that has been extracted from the earth has been used to create synthetic products, such as tires, plastics, etc. As energy costs increase, the desirability of producing oil from naturally occurring reserves or synthetically produced oil source material also increases. Thus, there is a need for a method of producing oil from such source materials.

SUMMARY OF THE INVENTION

Accordingly, the present invention provides methods of producing oil. The present invention also provides a system for production of oil, associated with such methods. In one aspect, for example, a method of producing oil is provided. Such a method may include providing a naturally occurring or synthetically produced hydrocarbon source material. The method may also include physically degrading the hydrocarbon source material into small pieces. The method may further include heating the hydrocarbon source material indirectly to a temperature sufficient to gasify hydrocarbons in the hydrocarbon source material and release the hydrocarbons therefrom. Additionally, the method may include capturing the hydrocarbons released from the source material. Still further, the method may include separating the hydrocarbons into like components. Even further, the method may include collecting the like hydrocarbon components.

The present invention additionally provides a system for producing oil. The system may comprise a container for a naturally occurring or synthetically produced hydrocarbon source material. The system may also comprise a material preparation device to physically degrade the hydrocarbon source material into small pieces. The system may further comprise a heat source to heat the hydrocarbon source material indirectly by heating the container, the hydrocarbon source material being heated to a temperature sufficient to gasify hydrocarbons in the hydrocarbon source material and release the hydrocarbons therefrom. The system may still further comprise a fractionation device fluidly coupled to the container to receive the hydrocarbons and separate the hydrocarbons into like components. Additionally, the system may comprise a collection container to receive the like components.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION OF THE INVENTION

Definitions

Figure 1:
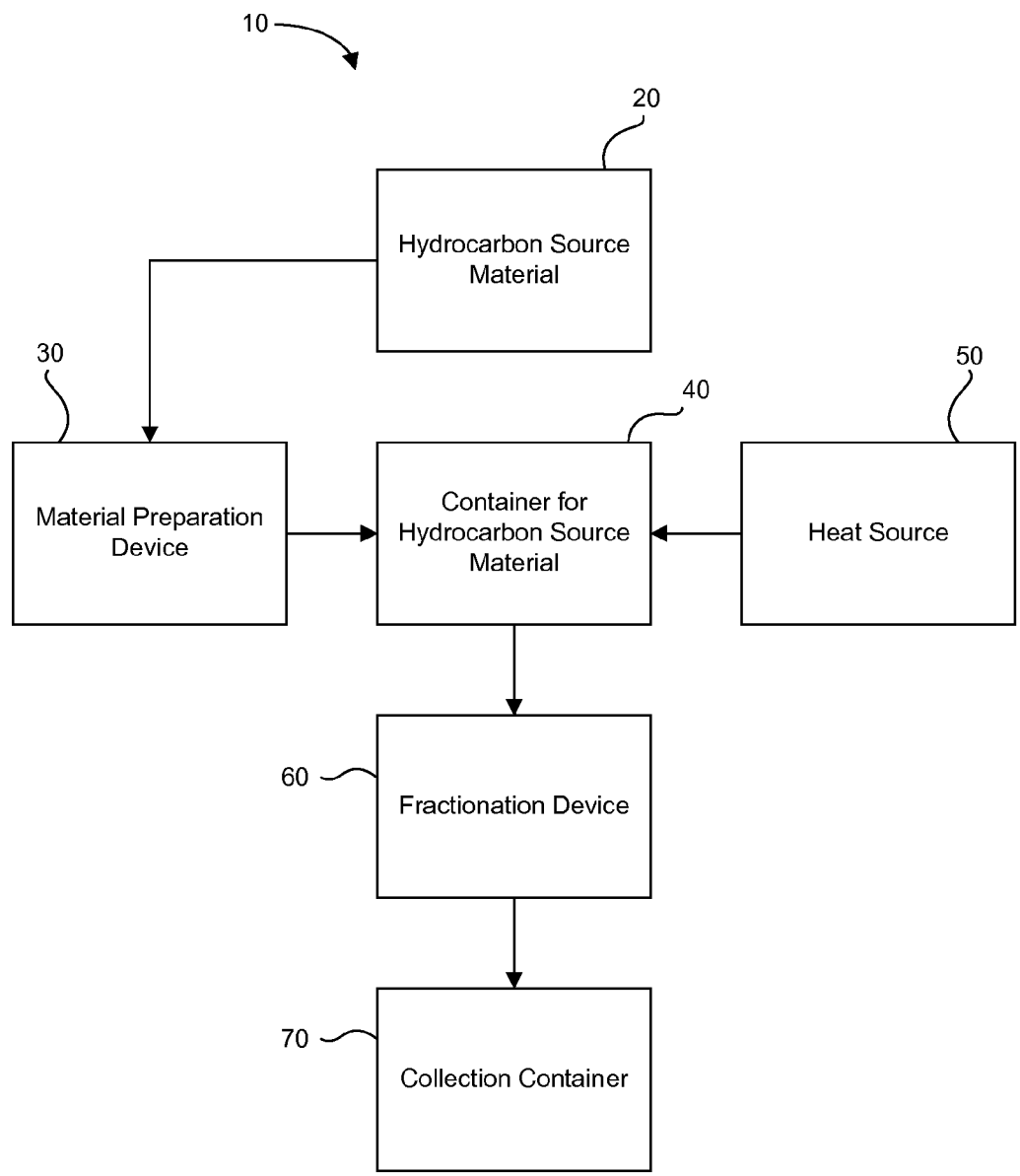
FIG. 1 is a schematic diagram of a system for producing oil in accordance with an embodiment of the present invention.

In describing and claiming the present invention, the following terminology will be used in accordance with the definitions set forth below.

The singular forms "a," "an," and, "the" include plural referents unless the context clearly dictates otherwise. Thus, for example, reference to "a collection container" includes reference to one or more of such collection containers, and reference to "the tire" includes reference to one or more of such tires.

As used herein, the term "about" is used to provide flexibility to a numerical range endpoint by providing that a given value may be "a little above" or "a little below" the endpoint.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

The present invention relates to oil production, particularly, oil naturally occurring within a source material or oil within a synthetically produced or man-made source material. With reference to FIG. 1, illustrated is a schematic diagram of system 10 for producing oil in accordance with an embodiment of the present invention. The system 10 can include a naturally occurring or synthetically produced hydrocarbon source material 20. The hydrocarbon source material can be oil shale, tar sand, coal, slurp-sludge, or any other naturally occurring source of hydrocarbons. Additionally, the hydrocarbon source material 20 can be a tire, plastic, or any other synthetically produced source of hydrocarbons, including small or long chain hydrocarbons, or combinations thereof. In one aspect, the hydrocarbon source material 20 can include municipal solid waste products, such as garbage, which may contain hydrocarbon material.

The system 10 can also include a material preparation device 30 to physically degrade the hydrocarbon source material into small pieces. In one aspect, the material preparation device 30 can be a rock crusher or a shredder. The rock crusher can be used to reduce the size of shale, coal, or other hard and relatively large source materials. The rock crusher can reduce the size of the source material to roughly the size of small stones (less than about 4 inches in diameter). Similarly, the shredder can be used to shred tires, plastic, garbage, or other source materials that are not amenable to crushing, but that may be shredded. The shredder can reduce the size of the source material to small strips or chunks (less than about 6 inches wide). Such material preparation using a crusher or a shredder can increase the efficiency of the system in producing oil.

The system 10 can also include a container 40 for the naturally occurring or synthetically produced hydrocarbon source material 20. The container can be used to contain the hydrocarbon source material 20 while hydrocarbons are being harvested from the source material. The container 40 is discussed in more detail below.

Additionally, the system 10 can include a heat source 50 to heat the hydrocarbon source material 20 indirectly. Indirect heating of the source material can be accomplished by heating the container 40, which contains the hydrocarbon source material. The container can be heated until the hydrocarbon source material contained within is heated to a temperature sufficient to gasify hydrocarbons in the source material and release the hydrocarbons from the source material. In one aspect, the container can be heated to about 750 degrees F. to about 1000 degrees F. Gasified and released hydrocarbons can be extracted from the container for processing. In one aspect, the heat source 50 can generate heat by combustion. In another aspect, the heat source 50 can comprise a furnace, such as an electric, gas, oil, wood, coal, or other suitable type of furnace.

From the container 40, the gasified hydrocarbons can be directed to a fractionation device 60, which is fluidly coupled to the container to receive the hydrocarbons and separate the hydrocarbons into like components. Following fractionation, the hydrocarbons can be delivered to a collection container 70 to receive the like components.

Figure 2:
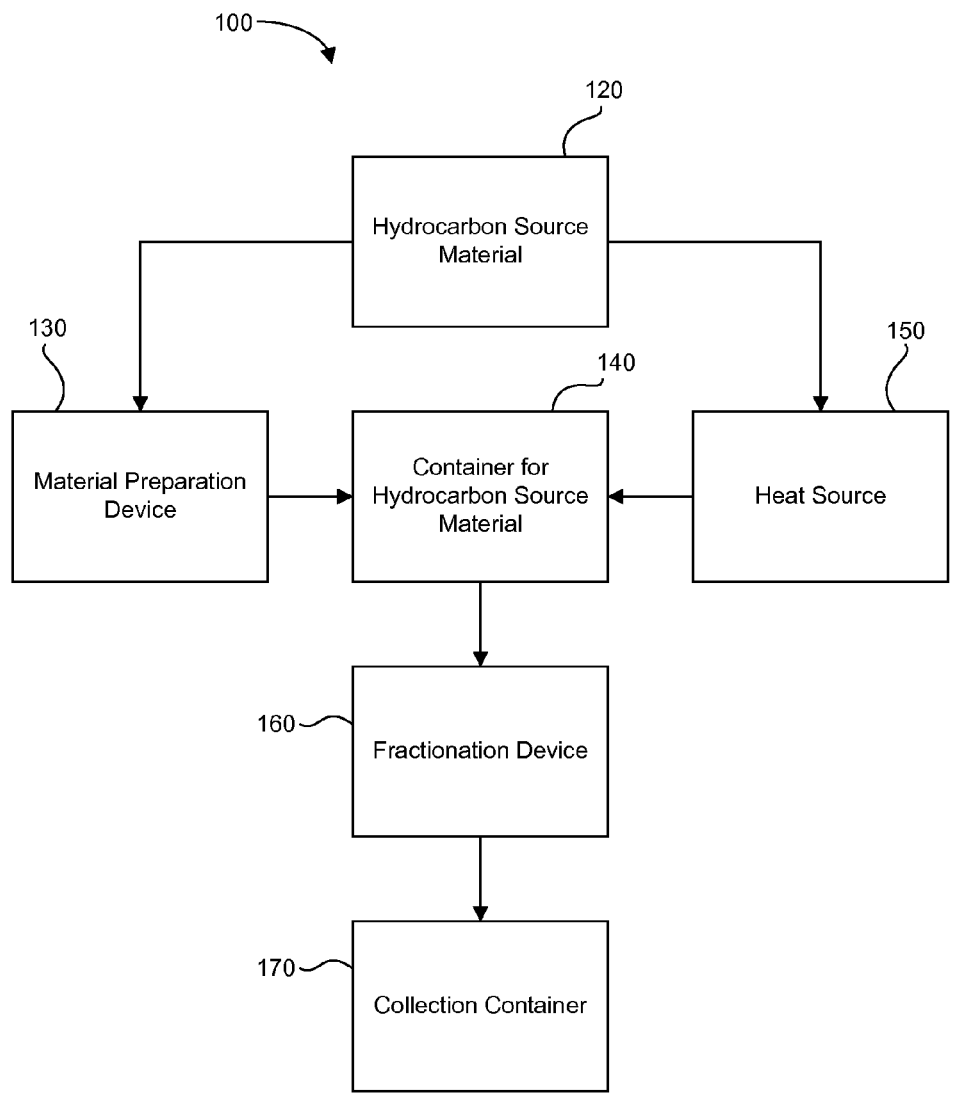
FIG. 2 is a schematic diagram of a system for producing oil in accordance with another embodiment of the present invention.

With reference to FIG. 2, illustrated is a system 100 for producing oil in accordance with another embodiment of the present invention. The system 100 is similar in many respects to the system 10, discussed above. For example, the system 100 can include a hydrocarbon source material 120, a material preparation device 130, a container for the hydrocarbon source material 140, a heat source 150, a fractionation device 160, and a collection container 170. However, this embodiment illustrates that hydrocarbon source material can be used by the heat source 150 to generate heat for harvesting hydrocarbons from other hydrocarbon source material. In one aspect, the heat source 150 can generate heat by combustion of a suitable hydrocarbon source material, such as a used tire. Thus, not only can hydrocarbons be produced from the hydrocarbon source material, but the hydrocarbon source material can be used to power the production process.

Figure 3:
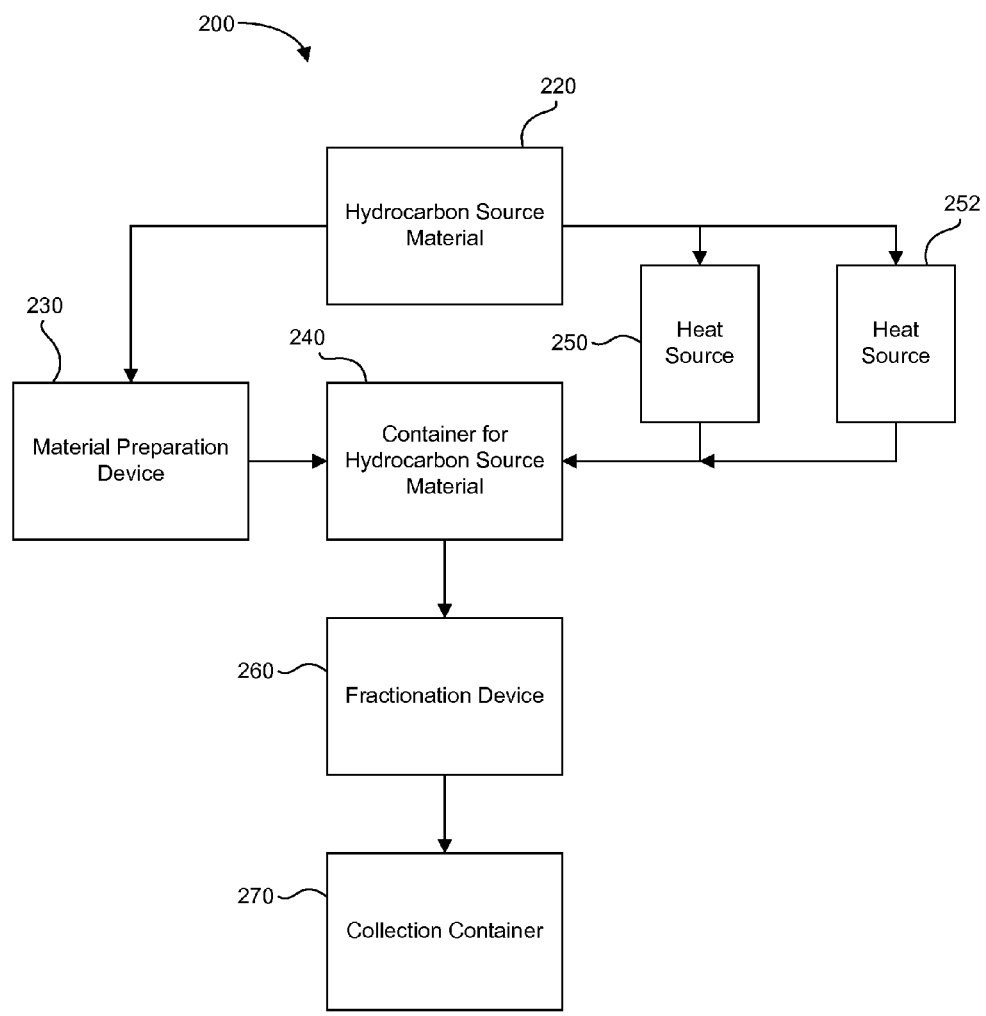
FIG. 3 is a schematic diagram of a system for producing oil in accordance with yet another embodiment of the present invention.

In another embodiment, illustrated in FIG. 3, a system 200 is shown. As in the previous examples, the system 200 can include a hydrocarbon source material 220, a material preparation device 230, a container for the hydrocarbon source material 240, a heat source 250, a fractionation device 260, and a collection container 270. However, this embodiment illustrates that the system 200 can further include a second heat source 252. For example, the second heat source 252 can work in tandem with the first heat source 250, such that when hydrocarbon source material, such as a used tire, is consumed in the first heat source 250, the second heat source 252 can generate heat by combustion of additional hydrocarbon source material, such as a second used tire. Thus, the heat sources can be used in an alternating fashion to deliver a continuous flow of heat to the container 220 and, thus, indirectly heating the hydrocarbon source material 220 contained within the container. In another aspect, the second heat source 252 can be used concurrently with the first heat source 250. This may be done to increase the amount of heat transferred to the container and the hydrocarbon source material, or it may be that different types of hydrocarbon source materials are used in each of the heat sources and, for convenience or practicality, they are kept separate during combustion.

Figure 4:
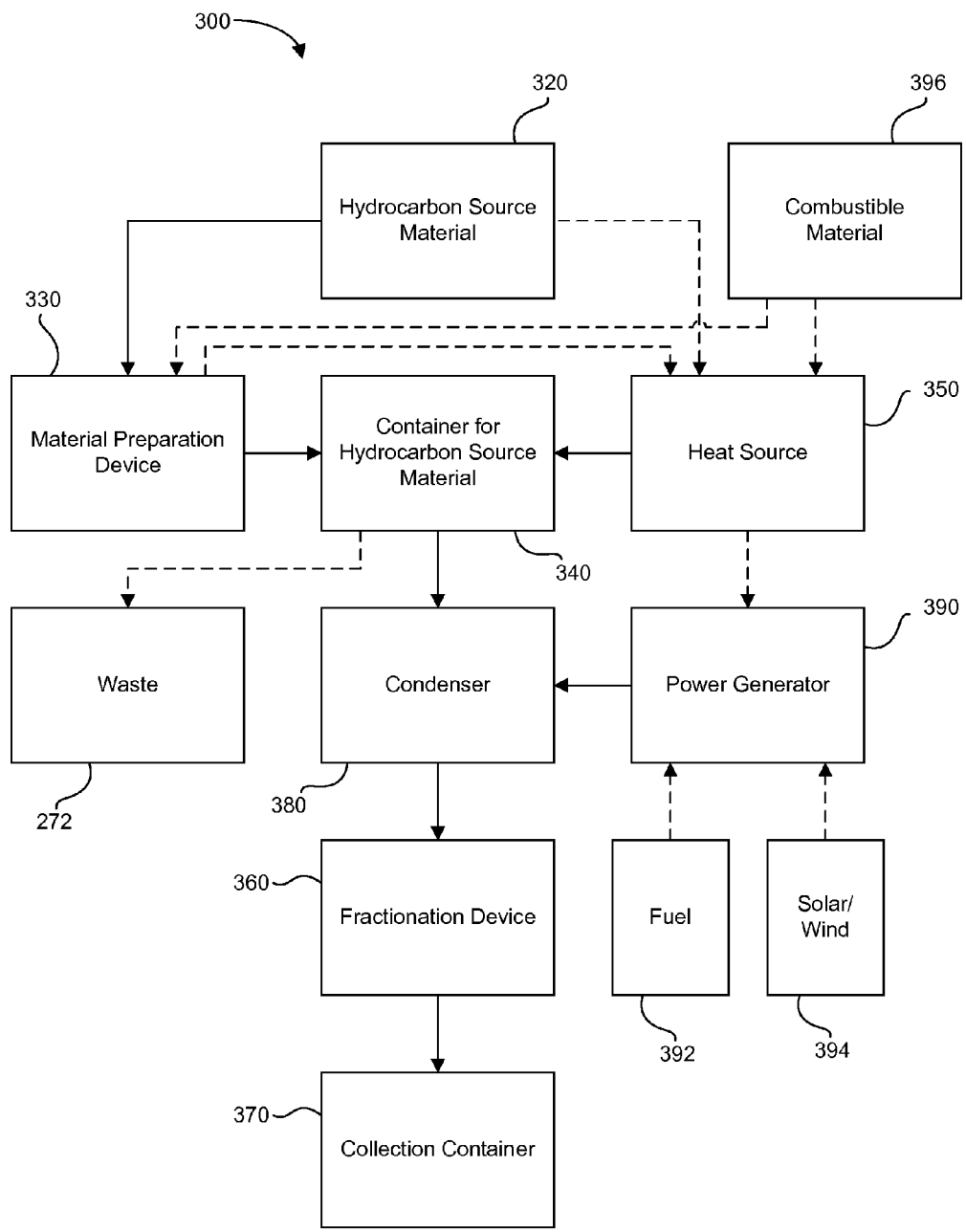
FIG. 4 is a schematic diagram of a system for producing oil in accordance with still another embodiment of the present invention.

In yet another embodiment, illustrated in FIG. 4, a system 300 is shown. As in the preceding examples, the system 300 can include a hydrocarbon source material 320, a material preparation device 330, a container for the hydrocarbon source material 340, a heat source 350, a fractionation device 360, and a collection container 370. However, this embodiment illustrates, among other things, that the system 300 can further include a condenser 380. The condenser 380 can cause at least a portion of the gasified and released hydrocarbons extracted from the container 370 to change from a gaseous phase to a liquid phase. Thus, the condenser 380 can operate with the fractionation device 360 to separate the hydrocarbons into like components.

The system 300 further illustrates that once the hydrocarbon source material has been heated and hydrocarbons have been harvested, the depleted source material can be removed from the container and disposed of as waste 272. In one aspect, such waste 272 can be used for constructive purposes, such as fill material or other construction applications.

In another aspect, the system 300 illustrates a power generator 390 that can power system 300 components, such as the condenser 380. The power generator 390 can use heat from the heat source 350 to generate electrical power. For example, heat from the heat source can be used to make steam for a steam generator. In another example, the power generator can be powered by fuel 392 or by electricity from renewable sources of energy, such as wind or solar power 394 derived from windmills or solar cells, respectively. Thus, in one aspect, the power generator 390 can comprise an internal combustion engine utilizing a combustible fuel and/or an energy storage device such as a battery or a capacitor.

In yet another aspect, the system 300 illustrates that hydrocarbon source materials 320 used by the heat source 350 can be in their native condition or they can be processed by the material preparation device 330 to reduce the size and increase the quantity of source material pieces, thereby increasing surface area for combustion. For example, a tire can be shredded prior to combustion in the heat source 350. It should be understood that a mixture of large and small pieces of hydrocarbon source material 320 can be used together for combustion in the heat source 350.

The system 300 further illustrates that combustible material 396 can optionally be used by the heat source 350 as an alternative, or in addition to, the hydrocarbon source material 320. Combustible material 396 represents a different material from the hydrocarbon source material 320 that can be used by the heat source 350. In one aspect, the combustible material 396 can include non-hydrocarbon materials such as wood, cardboard, or paper products. In another aspect, the combustible material 396 can include municipal solid waste products, such as garbage or items and materials that may be contained in garbage. Thus, it is possible for the combustible material 396 to include some hydrocarbon material. The heat source 350 can therefore generate heat by combustion of materials such as garbage, municipal solid waste, or cardboard.

The combustible material 396 can be used in its native condition or it can be processed by the material preparation device 330 to reduce the size and increase the quantity of source material pieces, thereby increasing surface area for combustion. For example, cardboard can be shredded prior to combustion in the heat source 350. It should be understood that a mixture of large and small pieces of combustible material 396 can be used together for combustion in the heat source 350. It should be further understood that the various aspects, examples, and components of FIGS. 1-4 can be used together and interchangeably in any combination to achieve a desired result.

Additionally, the systems and methods discussed herein may use hydrocarbon materials to generate valuable by-products. For example, environmental credits such as renewable energy credits (RECs) and efficiency credits may be earned. RECs are tradable, non-tangible energy commodities in the United States that represent proof that one megawatt-hour (MWh) of electricity was generated from an eligible energy resource. The energy associated with an REC may be sold separately and used by another party. RECs can incentivize carbon-neutral renewable energy by providing a production subsidy to electricity generated from approved sources.

Figure 5:
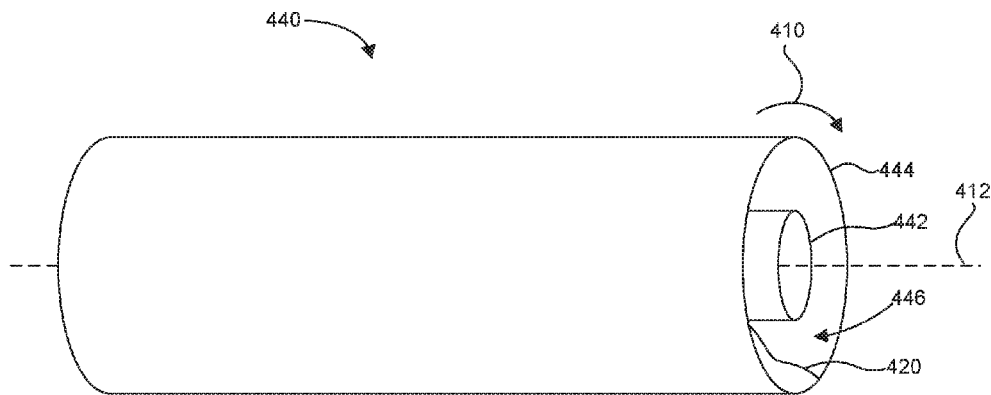
FIG. 5 is a side perspective view of a container for hydrocarbon source material in accordance with an embodiment of the present invention.

Turning now to a particular aspect of any one of the systems 10, 100, 200, 300, illustrated in FIG. 5 is a container 440. In one aspect, the container can include a first hollow cylinder 442 disposed within a second hollow cylinder 444. This creates an annular space 446 between the cylinders. The hydrocarbon source material 420 can be disposed in the annular space. Thus disposed, the heat source can apply heat to the center of the first hollow cylinder 442 to indirectly heat the hydrocarbon source material contained in the annular space. In one aspect, the first cylinder and the second cylinder can be between about 5 feet to about 10 feet in diameter. In another aspect, the first cylinder and the second cylinder can be between about 30 feet long and about 60 feet long.

Figure 6:
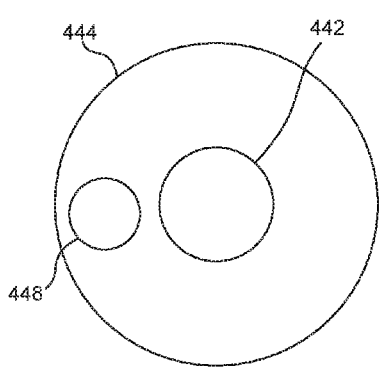
FIG. 6 is an end view of the container for hydrocarbon source material of FIG. 5, showing an inlet.
Figure 7:
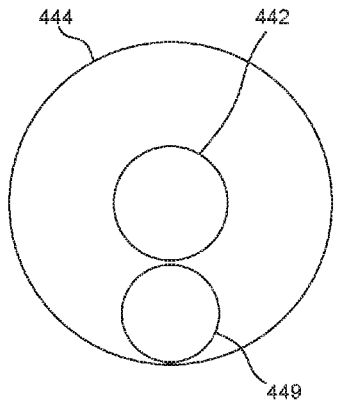
FIG. 7 is an end view of the container for hydrocarbon source material of FIG. 5, showing an outlet.

With reference to FIGS. 6-7 illustrating end views of the container 440, and continued reference to FIG. 5, in a further aspect, the container 440 can include an inlet 448 to receive hydrocarbon source material 420. Additionally, the second hollow cylinder 444 can be rotatable about an axis 412 in direction 410 to cause the hydrocarbon source material 420 to churn and move toward an outlet 449 of the container 440. In one aspect, the first hollow cylinder 442 can rotate about the axis. Thus, it should be recognized that the second cylinder can rotate about the axis relative to the first cylinder and vice versa. In a particular aspect, the first cylinder and the second cylinder can rotate at different speeds and/or different directions about the axis. In another particular aspect, the first cylinder and the second cylinder can rotate about the axis at the same speed and in the same direction. In still another aspect, the first cylinder is stationary and an auger can be used to move the source material toward the outlet of the container.

In another aspect, the container can comprise a trammel. One known example of a trammel is disclosed in U.S. Pat. No. 5,499,586, which is incorporated herein by reference in its entirety.

Figure 8:
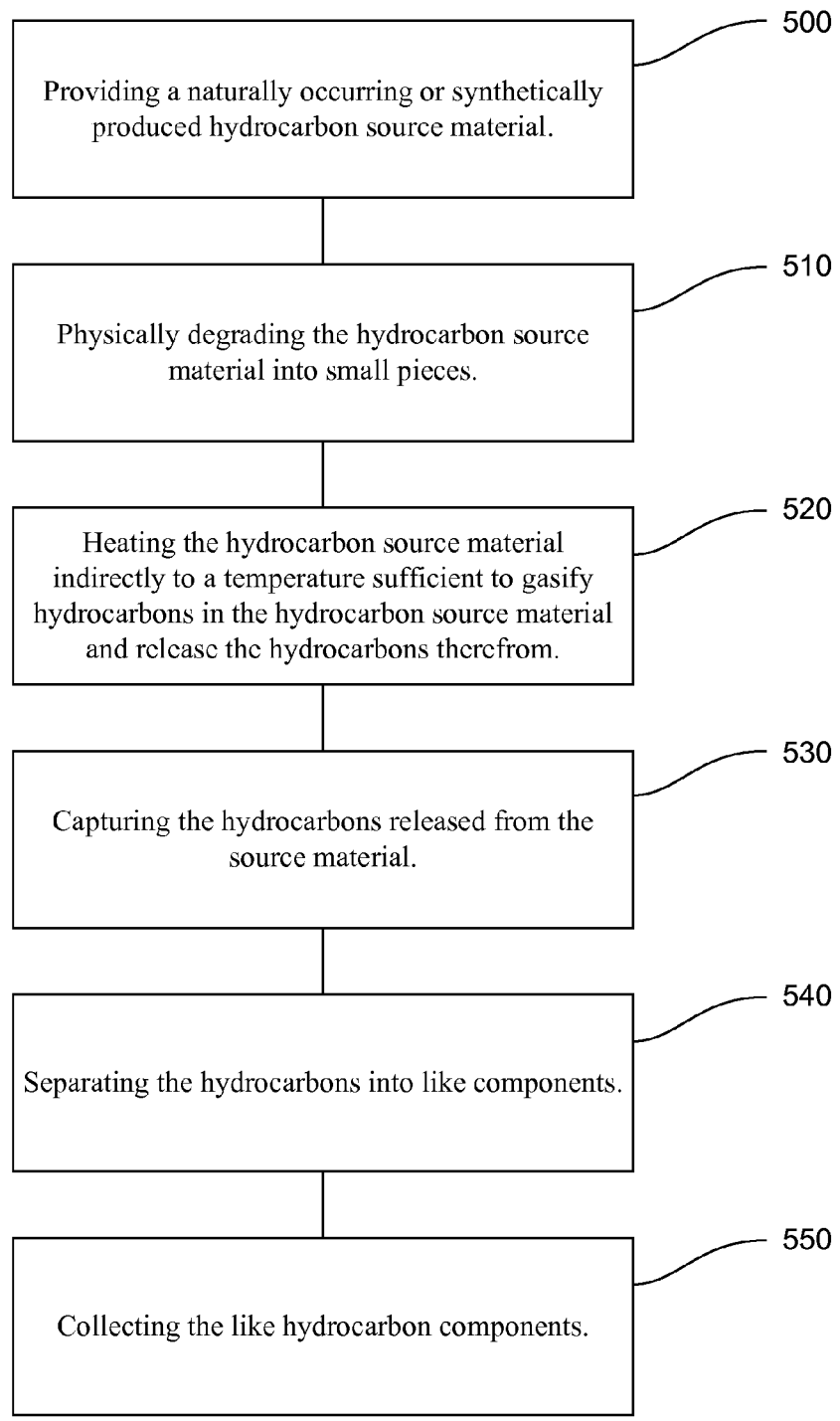
FIG. 8 is a schematic diagram of a method of producing oil in accordance with an embodiment of the present invention.

In a related embodiment, and to reiterate to some degree, a method of producing oil in accordance with the principles herein is shown in FIG. 8. The method can comprise providing a naturally occurring or synthetically produced hydrocarbon source material 500. Additionally, the method can comprise physically degrading the hydrocarbon source material into small pieces 510. The method can also comprise heating the hydrocarbon source material indirectly to a temperature sufficient to gasify hydrocarbons in the hydrocarbon source material and release the hydrocarbons therefrom 520. The method can further comprise capturing the hydrocarbons released from the source material 530. Still further, the method can comprise separating the hydrocarbons into like components 540. Yet further, the method can comprise collecting the like hydrocarbon components 550. It is noted that no specific order is required in this method, though generally in one embodiment, these method steps can be carried out sequentially.

In a specific aspect, the hydrocarbon source material can be selected from the group consisting of oil shale, tar sand, coal, slurp-sludge, a tire, and plastic. In another specific aspect, physically degrading can comprise crushing or shredding the hydrocarbon source material. In yet another specific aspect, heating the hydrocarbon source material can comprise combusting a used tire. In still another specific aspect, heating the hydrocarbon source material can comprise directing heat into a first hollow cylinder, the first hollow cylinder being disposed within a second hollow cylinder creating an annular space between the cylinders, the hydrocarbon source material being disposed in the annular space and thereby being indirectly heated.

In one aspect, the method can further comprise churning and moving the hydrocarbon source material toward an outlet of the container by rotating the second hollow cylinder about an axis. In another aspect, the method can further comprise disposing hydrocarbon source material in the annular space through an inlet of the container. In yet another aspect, the method can further comprise condensing at least a portion of the gasified and released hydrocarbons, from a gaseous phase to a liquid phase. In a specific aspect, the released hydrocarbons, in either a gaseous or a liquid phase, can be used for heating hydrocarbon source material. Thus, hydrocarbons released by the process can be used to further the process for additional hydrocarbon source material.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for producing oil, comprising:
   a container for a naturally occurring or synthetically produced hydrocarbon source material, wherein the container comprises a first hollow cylinder disposed within a second hollow cylinder creating an annular space between the cylinders, the hydrocarbon source material being disposed in the annular space;
   a material preparation device to physically degrade the hydrocarbon source material into small pieces;
   a heat source to heat the hydrocarbon source material indirectly by heating the container, the hydrocarbon source material being heated to a temperature sufficient to gasify hydrocarbons in the hydrocarbon source material and release the hydrocarbons therefrom;
   a fractionation device fluidly coupled to the container to receive the hydrocarbons and separate the hydrocarbons into like components; and
   a collection container to receive the like components;
   wherein the heat source applies indirect heat to the center of the first hollow cylinder to indirectly heat the hydrocarbon source material;
   wherein the second hollow cylinder is configured to rotate about an axis relative to the first hollow cylinder to cause the hydrocarbon source material to churn and move toward an outlet of the container and;
   wherein the first hollow cylinder is configured to rotate about an axis relative to the second hollow cylinder, in a different direction from the second hollow cylinder.

2. The system of claim 1, wherein the container contains the hydrocarbon source material, and the hydrocarbon source material is selected from the group consisting of oil shale, tar sand, coal, slurp-sludge, a tire, and plastic.

3. The system of claim 1, wherein the container comprises an inlet to receive hydrocarbon source material.

4. The system of claim 1, wherein the material preparation device is a rock crusher or a shredder.

5. The system of claim 1, wherein the heat source comprises a furnace that generates heat by combustion of a used tire.

6. The system of claim 1, wherein the heat source contains at least one of garbage, municipal solid waste, and cardboard to be combusted to generate heat.

7. The system of claim 5, further comprising a second heat source comprising a furnace to work in tandem with the first heat source, such that when the used tire is consumed in the first heat source, the second heat source generates heat by combustion of a second used tire.

8. The system of claim 1, further comprising a condenser to cause at least a portion of the gasified and released hydrocarbons to change from a gaseous phase to a liquid phase.

* * * * *